June 13, 1933. B. PREDMORE 1,913,454
METHOD OF MAKING INFLATABLE BALLS
Filed Oct. 27, 1931 2 Sheets-Sheet 1

Inventor
Bert Predmore
By Rockwell & Santhlow
Attorneys

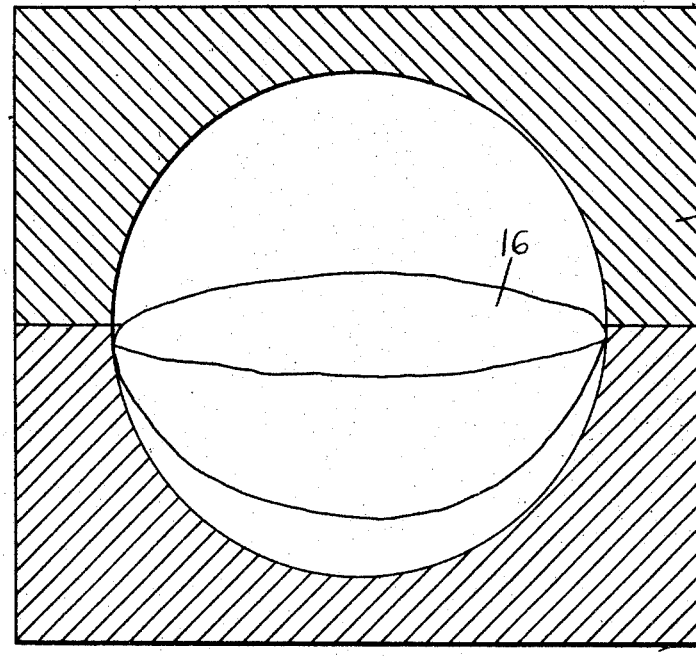
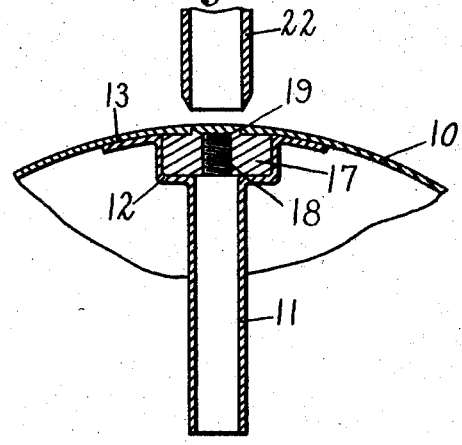
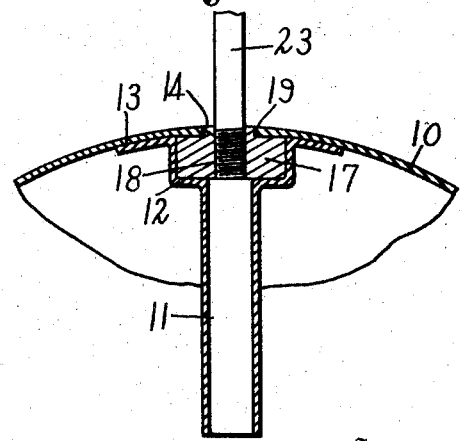

Patented June 13, 1933

1,913,454

UNITED STATES PATENT OFFICE

BERT PREDMORE, OF NEW HAVEN, CONNECTICUT, ASSIGNOR TO THE SEAMLESS RUBBER COMPANY, INCORPORATED, OF NEW HAVEN, CONNECTICUT

METHOD OF MAKING INFLATABLE BALLS

Application filed October 27, 1931. Serial No. 571,373.

This invention relates to inflatable balls and the process of making the same, and more particularly to an inflatable ball provided with a neck or tube through which air may be introduced into the ball to inflate it.

My improvements may be used either in connection with the manufacture of a so-called bladder or any inflatable ball to be used within a cover, or it may be used in the manufacture of a ball made of relatively heavy rubber or the like to be used without a cover, such as play balls, water balls, and similar articles.

One object of the invention is the provision of a new and improved process for the manufacture of inflatable articles of this character.

Another object of the invention is the provision of a method of manufacturing inflatable balls whereby the ball is manufactured in a mold with the filler tube or stem disposed on the interior wall thereof, and thereafter an opening is cut in the wall of the ball and the filler tube withdrawn to extend outwardly for purposes of inflation.

A still further object of the invention is the provision of a method for manufacturing inflatable balls of this character wherein the ball is originally manufactured with an imperforate wall and the filler tube located therewithin, the wall being thereafter provided with an opening through which the tube is pulled outwardly.

A still further object of the invention is the provision of an improved inflatable ball having an exteriorly projecting inflating tube and provided with means to receive the tube in folded condition below the outer wall of the ball to prevent the egress of air after inflation.

Still another object of the invention is the provision of an improved inflatable ball which may be readily and economically manufactured and which is so constructed that the filler tube may be readily closed against loss of air after inflation, and which may be folded and disposed within the ball after inflation so that the latter will present a smooth exterior surface.

To these and other ends the invention consists in the novel features and combinations of parts to be hereinafter described and claimed.

In the accompanying drawings:

Fig. 5 is a sectional view of a curing mold having the biscuit therewithin;

Fig. 6 is a fragmentary sectional view of the portion of the ball adjacent the filler tube showing a step in the manufacture of the article, and Fig. 7 is a view similar to Fig. 6 showing a further step in the method of making the ball.

Figure 1:
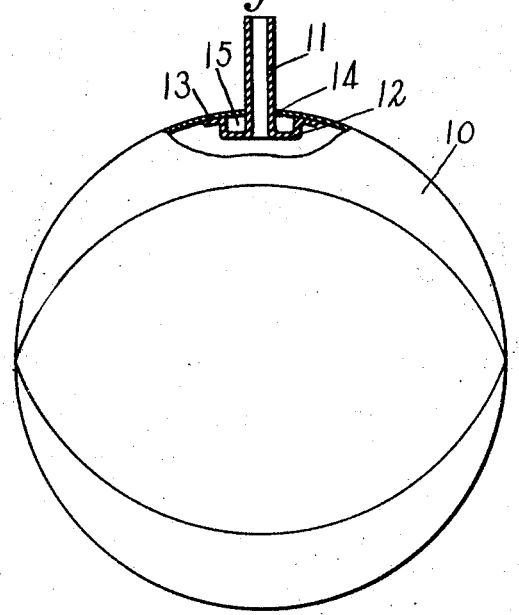
Fig. 1 is an elevational view of a completed ball embodying my improvements, a part thereof being shown in section.
Figure 2:
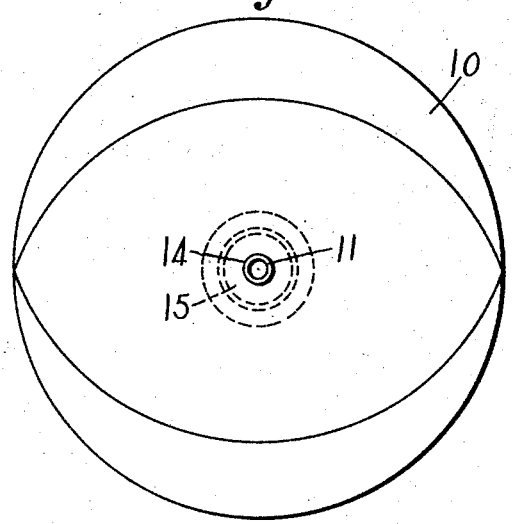
Fig. 2 is a top plan view of the ball shown in Fig. 1.

In Fig. 1 of the drawings I have shown a ball 10 which may be formed of rubber or the like and which is provided with a hollow filler tube 11 projecting exteriorly from the surface of the ball, the bore of which tube communicates with the interior so that air may be introduced through this tube.

Figure 3:
Fig. 3 is a fragmentary sectional view of the ball adjacent the filling opening showing the filler tube being folded and disposed within the ball.

The tube 11 is connected to or formed integrally with a circular flange or base portion 12 which is secured to the inner surface of the ball 10, as shown at 13, so as to make an air-tight connection therewith. The filler tube 11 projects outwardly through an opening 14 formed through the wall of the ball 10, and the flange 12, as shown in Figs. 1 and 3, is in the completed ball spaced from the wall so as to provide a space or pocket 15 within which the tube may be inserted after the latter is folded, as clearly shown in Fig. 3.

I will now describe the preferred process of manufacturing my improved ball, although it will be understood that the steps described need not be strictly followed and various changes or modifications may be resorted to in this respect, as will clearly appear to those skilled in the art.

Figure 4:
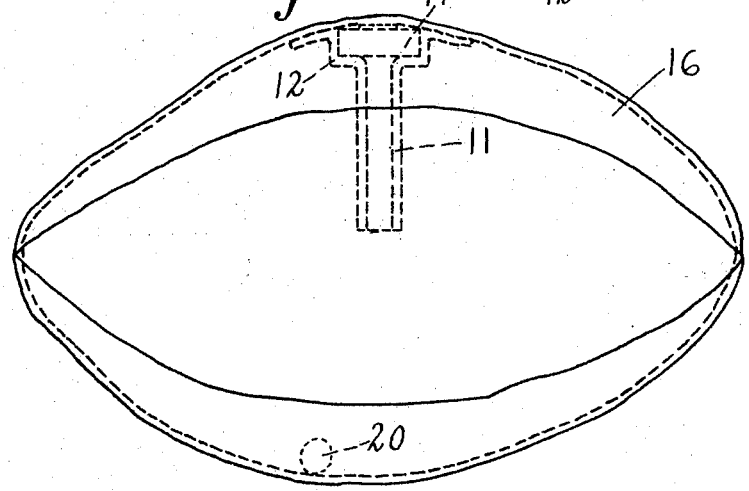
Fig. 4 is an elevational view of the blank or biscuit of which the ball is made.

In the manufacture of the ball, I prefer to form a number of sections 16 which will be segmental in shape so as to produce a substantially spherical article. The edges of these sections may be secured together prior to vulcanization in any well-known manner to form the blank or biscuit shown in Fig. 4. One of the sections 16 is provided upon its lower or interior surface with the tube 11 and flange 12. The peripheral edge of the flange may be cemented or otherwise secured to the section 16 so as to hold it in position during the vulcanizing process.

The circular plug 17 is inserted between the interior wall of the ball and the flange 12 so that the flange will be spaced from this wall.

The plug 17 may be of any suitable material, but I have found it convenient to use a metallic plug. It will be held in place during vulcanization between the flange 12 and the ball. This plug may be provided with a central threaded opening 18, for a purpose to be described hereinafter, and an annular rib 19 about this opening, this rib being provided with a relatively sharp upper edge.

Prior to securing the sections 16 together, a tablet or pill 20 is introduced into the biscuit, which tablet is composed of a gas-forming substance so that during vulcanization gas will be given off to inflate the ball into contact with the mold surfaces.

As shown in Fig. 5, the completed biscuit is then placed within a suitable mold such as the two-part mold 21, shown in Fig. 5. The shape of the mold cavity will, of course, be that desired in the finished ball. Vulcanization of the ball is now effected, heat being applied in any known and suitable manner. During this process gas will be given off by the tablet 20 and the ball will be expanded to fill the mold cavity. During the vulcanization process the edges of the section 16 will, of course, be vulcanized together and likewise the edge 13 of the flange 12 will be vulcanized to the inner wall of the ball. It will be found convenient to form the tube 11 integrally with the flange or base portion 12, but if these members are formed separately, they also will be vulcanized together during this step in the process.

The ball when removed from the mold will be substantially spherical in form and will present a continuous or solid exterior surface, the plug 17 being concealed below the wall of the ball and lying between this wall and the flange 12. The position of this plug may now be found by feeling the exterior surface of the ball with the fingers, this being expedited by the rib 19 which projects outwardly from the plug. When the plug has been located, the opening 14 is cut through the casing or wall of the ball by means of the hollow cutting tool 22 which cooperates with the rib 19 to cut a circular opening in the casing about this rib. A threaded rod 23 may then be inserted through the opening 14 and engage with the threaded opening 18 of the plug. The plug may then be removed from its socket in the flange 12, by means of the rod 23, through the opening 14, which will expand or spread sufficiently to permit the plug to be pulled therethrough.

A hook or other suitable tool (not shown) may then be inserted through the opening 14 to engage the lower end of the tube 11, and the tube is then pulled upwardly through its own bore and is drawn through the opening 14 so as to extend without the ball, as shown in Fig. 1. As this tube is made of rubber it will readily permit of this operation and the result will be as shown in this figure that the tube will extend from the flange 12 through the opening 14 in the outer wall of the ball leaving a space or pocket 15 between the flange 12 and the wall of the ball.

When the ball has been inflated the walls of the tube 11 may be pressed together and the tube then folded upon itself and inserted through the opening 14 to lie in the space 15, as clearly shown in Fig. 3. It will be understood that particularly when the ball is inflated the flange 12 will be urged toward the outer wall of the ball so as to compress the walls of the tube 11 tightly together and prevent egress of air through the tube. In this manner the tube may readily be sealed after the ball has been inflated.

While I have shown and described a preferred embodiment of my invention and a preferred method of manufacturing the same, it will be understood that both article and method are capable of modification and variation and are not to be limited to the particular form or steps described, which article and method are to be interpreted as defining a preferred form of the invention, and not as limitations thereof.

What I claim is:

1. The method of making an inflatable ball, comprising forming a hollow biscuit having a stem secured to the inner surface of the wall thereof, vulcanizing the biscuit and then drawing the stem outwardly through an opening in the wall of the ball.

2. The method of making an inflatable ball, comprising preparing an imperforate biscuit of unvulcanized rubber or the like having a stem projecting inwardly from the wall thereof, vulcanizing the biscuit, effecting an opening in the wall of the vulcanized ball opposite the stem, and drawing the stem outwardly through said opening.

3. The method of making an inflatable ball having a stem projecting outwardly from the casing thereof, which comprises forming a hollow biscuit of unvulcanized rubber or the like having a stem projecting inwardly from the wall thereof and a flange on the stem secured to the casing of the ball, positioning a spacing member between the flange and the wall of the casing, vulcanizing the biscuit, and then removing said plug to leave a pocket between the stem flange and the casing.

4. The method of making an inflatable ball having a stem projecting outwardly from the casing thereof, which comprises forming a hollow biscuit of unvulcanized rubber or the like having a stem projecting inwardly from the wall thereof and a flange on the stem secured to the casing of the ball, positioning a spacing member between the flange and the wall of the casing, vulcanizing the biscuit, and then forming an opening in the casing of the ball opposite the stem and withdrawing the plug through said opening.

5. The method of making an inflatable ball having a stem projecting outwardly from the casing thereof, which comprises forming a hollow biscuit of unvulcanized rubber or the like having a stem projecting inwardly from the wall thereof and a flange on the stem secured to the casing of the ball, positioning a spacing member between the flange and the wall of the casing, vulcanizing the biscuit, then forming an opening in the casing of the ball opposite the stem and withdrawing the plug through said opening, and then pulling the stem outwardly through said opening so that the stem projects without the ball.

6. The method of making an inflatable ball or the like, which comprises forming an imperforate biscuit of unvulcanized rubber or the like, placing upon the inner wall of the biscuit a spacing plug, securing to said wall over said spacing plug the flange portion of a hollow flanged stem, vulcanizing the said biscuit in a suitable mold, cutting an opening through the wall of the ball opposite the bore of the stem, and withdrawing the plug through said opening.

7. The method of making an inflatable ball or the like, which comprises forming an imperforate biscuit of unvulcanized rubber or the like, placing upon the inner wall of the biscuit a spacing member, securing to said wall over said spacing member the flange portion of a hollow flanged stem, vulcanizing the said biscuit in a suitable mold, cutting an opening through the wall of the ball opposite the bore of the stem, and drawing the stem outwardly through said opening whereby the stem projects outwardly from the ball and a pocket is provided between the stem flange and the inner face of the casing.

8. The method of making an inflatable ball, which comprises preparing a plurality of ball sections of unvulcanized rubber or the like, placing against the inner surface of one of said sections a spacing member having a projecting annular rib lying against the section, securing to the said section over said spacing member a hollow flanged stem whereby the central portion of the flange of the stem is spaced from the material of said section by the spacing member, inserting a gas-forming substance between the sections, securing said sections together to form a biscuit with the stem projecting inwardly from the section upon which it is placed, vulcanizing the biscuit thus formed, cutting an opening in the wall of the ball about said annular rib, and withdrawing the spacing member and the hollow stem through said opening.

9. The method of making an inflatable ball, comprising cutting a plurality of ball sections from unvulcanized sheet rubber, securing to the surface of one of said sections a flanged stem with the periphery of the flange thereof lying against the surface of the section, disposing between the flange of the stem and the adjacent surface of the section a locating member, securing the sections together with said stem lying within the blank so formed and effecting the vulcanization thereof, cutting an opening through the wall of the ball opposite the locating member, and withdrawing said member and the stem through said opening.

10. The method of making an inflatable ball, which comprises cutting a plurality of ball sections from unvulcanized sheet rubber, providing a hollow rubber stem having a laterally projecting flange at one end thereof, securing the edges of the ball sections together with the peripheral edge of the flange secured to one thereof and projecting inwardly therefrom, vulcanizing the biscuit thus formed to form an imperforate ball having an interiorly projecting stem, and then cutting an opening in the ball opposite the stem and withdrawing the latter through said opening.

11. The method of making an inflatable ball which comprises forming a hollow biscuit having an inwardly projecting hollow stem, placing a gas-generating substance in the biscuit, closing the biscuit, molding and vulcanizing the same, and drawing the stem through the wall of the ball to an outwardly projecting position.

12. The method of making an inflatable ball which comprises forming a hollow biscuit having a stem secured to the wall thereof in an inwardly extending position, molding the ball by internally generated gas, and then drawing the stem outwardly through an opening in the wall of the ball.

13. The method of making an inflatable ball which comprises forming a hollow biscuit having a hollow stem member secured to the wall thereof in an inwardly projecting position and closed at one end, molding and vulcanizing the ball, and then drawing the stem outwardly through the wall of the ball.

14. The method of making an inflatable ball by molding it under the action of internally generated gas, which comprises the steps of attaching an interiorly projecting hollow stem to the biscuit and pulling the stem through the wall of the molded ball.

15. The method of making an inflatable article, which comprises forming a hollow biscuit having a hollow stem member secured to the wall thereof in an inwardly projecting position, said stem member being closed at the outer end and open at the inner end, molding and vulcanizing the article, opening the article and then drawing the stem outwardly through the wall of the article.

16. The method of making an inflatable ball or similar article, which comprises forming a hollow biscuit consisting of a number of pieces with a hollow inwardly projecting stem secured to the inner surface of one of the pieces, molding and vulcanizing the biscuit, and then drawing the stem outwardly through an opening cut through the wall of the ball.

17. The method of making an inflatable ball or similar article, which comprises forming a hollow biscuit having a stem member secured to the wall thereof in an inwardly projecting position and a locating member at the inner surface of the wall opposite said stem member, molding and vulcanizing the article, utilizing the locating member in cutting a hole through the wall of the article, and then withdrawing the locating member.

18. The method of making an inflatable ball, which comprises forming a hollow biscuit having a hollow stem member secured to the wall thereof in an inwardly projecting position and having a locating plug interposed between the stem member and the wall of the biscuit, molding and vulcanizing the biscuit, cutting a hole through the wall of the ball at a point opposite the locating plug, and then withdrawing the plug.

19. The method of making an inflatable ball, which comprises forming a hollow biscuit having a member projecting inwardly from the inner surface thereof and a locating plug adjacent said member, molding and vulcanizing the biscuit, cutting a hole through the wall of the ball opposite said locating member, and then withdrawing the locating member.

20. The method of making a hollow air-containing rubber article which comprises forming a hollow biscuit of separate sections of rubber, attaching to one of the sections of the biscuit a rubber stem in such a manner that it projects into the interior of the biscuit, molding the biscuit in a suitable mold, and then reversing the rubber stem and drawing it outwardly through an opening in the wall of the molded article so that it assumes an outwardly projecting position.

21. The method of making an inflatable hollow rubber article which comprises forming from a plurality of rubber sections a biscuit having a hollow rubber stem secured to one of the sections in an inwardly projecting position, molding the biscuit in a suitable mold by subjecting the biscuit to interior pressure while in the mold, and then turning the hollow stem member inside out and drawing it to a position in which it projects from the article exteriorly.

22. The method of making a molded inflatable article which comprises molding the same with a rubber stem projecting into its interior, and drawing the stem outwardly after the molding has been completed.

In witness whereof, I have hereunto set my hand this 21st day of October, 1931.

BERT PREDMORE.